United States Patent [19]

Vasilchenko et al.

[11] Patent Number: 4,553,886
[45] Date of Patent: Nov. 19, 1985

[54] SPINDLE HEADSTOCK

[76] Inventors: Georgy A. Vasilchenko, ulitsa Khersonskaya, 1, kv. 103; Leonid I. Alexeev, ulitsa Fridrikha Engelsa, 31/35, kv. 30, both of Moscow, U.S.S.R.

[21] Appl. No.: 641,195

[22] Filed: Aug. 16, 1984

[51] Int. Cl.⁴ .............................................. B23B 47/00
[52] U.S. Cl. ........................................ 409/233; 279/8; 408/239 R
[58] Field of Search ................. 409/233, 232; 408/239 R, 239 A; 279/8

[56] References Cited

U.S. PATENT DOCUMENTS 3,311,024  3/1967  Daugherty ........................ 409/233

FOREIGN PATENT DOCUMENTS 933290  6/1982  U.S.S.R. .

Primary Examiner—James M. Meister
Attorney, Agent, or Firm—Lilling & Greenspan

[57] ABSTRACT

A spindle headstock of a multiple-operation machine tool, whose housing accommodates, in a coaxial and rotatable arrangement, a spindle kinematically coupled to a rotary drive, a tie rod carrying members intended for connection to the shank of a boring head having a swivel carriage, which tie rod is axially adjustable in relation to the spindle, and a bar carrying toothed members for meshing with toothed members mounted on an end of a slide bar whose opposite end serves for radial displacement of the carriage. The bar is kinematically coupled to a drive whereby it is displaced in the axial direction in relation to the spindle. The members of the tie rod, which serve for connection to the shank of the boring head, are mounted on the tie rod so that they can radially reciprocate during location of the tie rod. For radial adjustment of the bar, a bushing is provided on the tie rod, which is axially stationary in relation to the tie rod and kinematically coupled to the spindle and bar.

2 Claims, 8 Drawing Figures

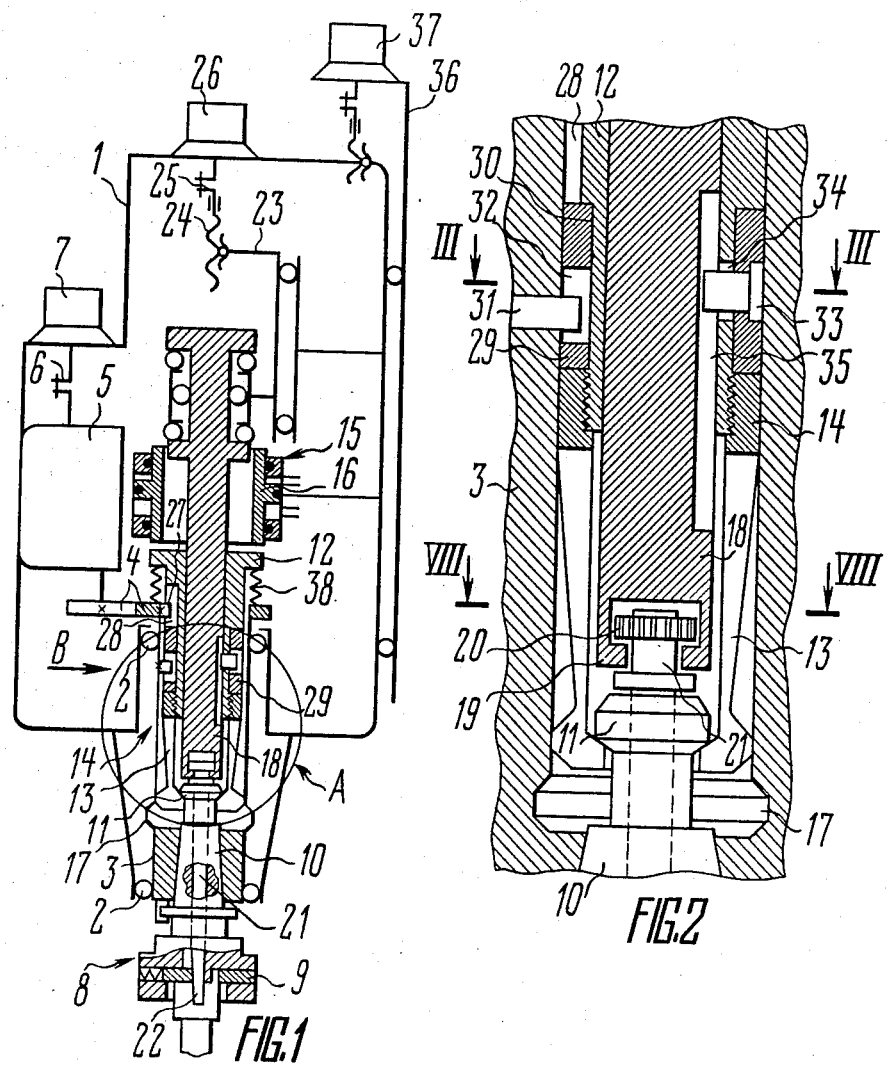

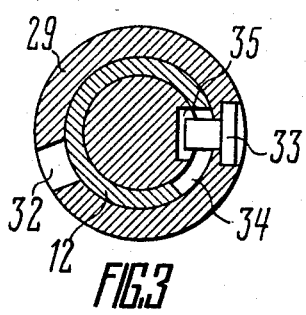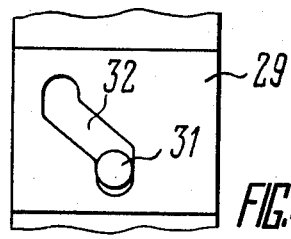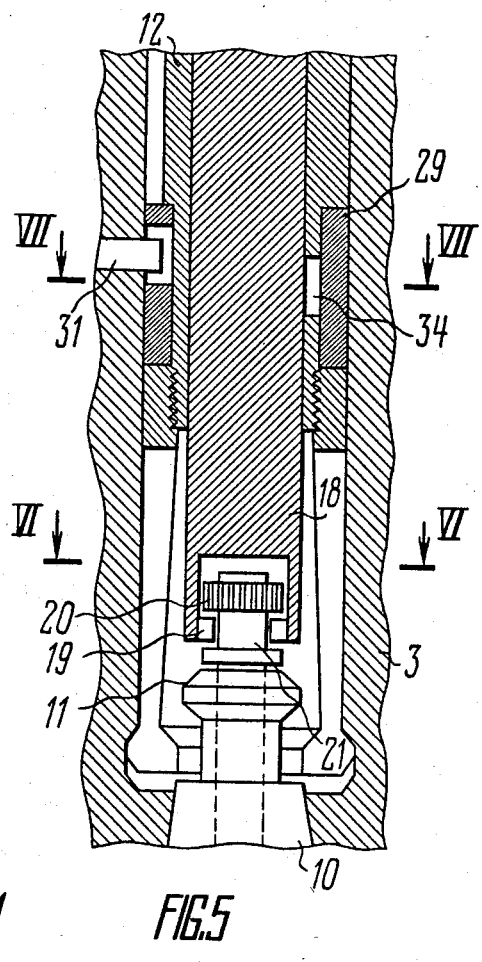

SPINDLE HEADSTOCK

FIELD OF THE INVENTION

The present invention relates to the manufacture of machine tools and is more specifically concerned with spindle headstocks.

The spindle headstock in accordance with the invention is best applicable to the machining of holes of complicated cross-sectional shapes on multiple-operation machine tools with automatic tool changers.

BACKGROUND OF THE INVENTION

There is known a spindle headstock of a multiple-operation machine tool, comprising a housing which accommodates in a coaxial and rotatable arrangement, a spindle, a tie rod, and a bar. The spindle is hollow and kinematically coupled to a main drive. It accommodates a shank of a mandrel of a boring head. The shank is provided with an external tooth rim at one of its ends, which is intended to mesh with an internal tooth rim provided at the end of the tie rod. The tie rod is kinematically coupled to a drive by means of which it is axially located and the tooth rims of the shank of the boring head and of the tie rod mesh with each other. The tie rod can be turned for location relative to the spindle through an angle such that the teeth of the tooth rims are brought to a position one opposite another.

Inside the tie rod there is a bar kinematically coupled to a drive which moves it in the axial direction. At one end of the bar there is an internal tooth rim which serves to mesh with an external tooth rim at one end of a slide bar whose opposite end serves to convert the translation motion of the bar in the axial direction to radial motion of the carriage.

In order to bring the teeth of the tooth rims of the bar and slide bar in a position opposite one another, the bar is kinematically coupled to the tie rod so that the two can rotate simultaneously for location (cf. USSR Inventor's Certificate No. 933,290).

In this spindle headstock, the shank of the mandrel of the boring head is coupled to the tie rod by means of a spline joint. This joint cannot provide for an accurate location of the boring head, because it is impossible to eliminate clearances between the teeth. The resultant bending moment causes deformation of the mandrel of the boring head and of the spindle, which affects the machining accuracy. A removal or loosening of the shank may disturb the correct angular positioning of its teeth, which, in turn, may be the cause of an accident.

The manufacture of a tooth rim for the shank, which would always provide for an accurate angular orientation, involves a number of serious difficulties.

SUMMARY OF THE INVENTION

It is an object of the present invention to improve the accuracy of location of the mandrel of the boring head in the spindle and make its clamping more secure.

It is another object of the invention to provide for a longer service life of spindle headstocks.

It is a further object of the invention to expand the range of application of machine tools.

The invention provides a spindle headstock of a multiple-operation machine tool, comprising a housing which accommodates, in a coaxial and rotatable arrangement, a spindle kinematically coupled to a main drive, a tie rod carrying members for connection to a shank of a boring head having a swivel carriage, the tie rod being adjustable in the axial direction in relation to the spindle, and a bar carrying toothed members intended to mesh with toothed members mounted on an end of a slide bar whose opposite end serves for radial displacement of the carriage, the bar being kinematically coupled to a drive which moves it in the axial direction in relation to the spindle, the spindle headstock being characterized, according to the invention, in that the members of the tie rod, which are intended for connection to the shank of the boring head, are mounted on the tie rod so that they can reciprocate in the radial direction during location of the tie rod, and in that a bushing is mounted on the tie rod for radial location of the bar, which bushing is axially stationary in relation to the tie rod and kinematically coupled to the spindle and bar.

It is preferred that the bushing be kinematically coupled to the spindle by means of a finger mounted on the spindle and a profiled groove provided in the bushing, and that the same bushing be kinematically coupled to the bar by means of a finger mounted on the bushing, extending through a hole provided in the tie rod and received in a longitudinal groove provided in the bar.

From the viewpoint of design, this type of kinematic coupling is the simplest. The spindle headstock in accordance with the invention provides for a rigid and secure connection of the shank of the boring bar to the spindle. It also provides a simple and reliable connection between the bar and the spindle for location of the bar relative to the slide bar.

BRIEF DESCRIPTION OF THE ACCOMPANYING DRAWINGS

Other objects and advantages of the present invention will become more apparent from a consideration of the following detailed description of a preferred embodiment thereof, taken in conjunction with the acompanying drawings, wherein:

FIG. 1 is a schematic elevation view of a spindle headstock in accordance with the invention;

FIG. 2 is a magnified view of area A in FIG. 1, showing the positions of the connection members with the shank of the boring head secured in the spindle;

FIG. 3 is a section taken on line III—III in FIG. 2;

FIG. 4 is a view taken in the direction of arrow B in FIG. 1;

FIG. 5 is a magnified view of area A in FIG. 1, showing the positions of the connection members prior to securing the shank of the boring head in the spindle;

DETAILED DESCRIPTION OF THE INVENTION

Figure 6:
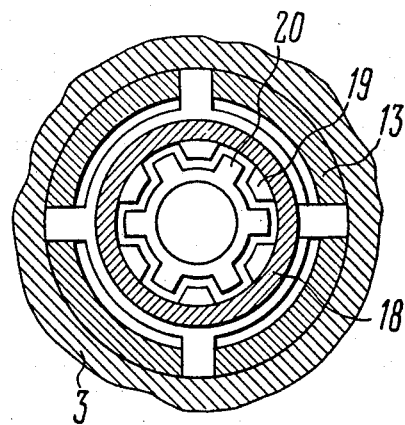
FIG. 6 is a section taken on line VI—VI in FIG. 5.

Referring to the attached drawings, the spindle headstock in accordance with the invention comprises a housing 1 (FIG. 1) accommodating bearings 2 in which a spindle 3 is mounted. The latter is hollow and connected to a main drive comprising gears 4, a gearbox 5, a coupling 6, and an electromotor 7. The spindle 3 accommodates a boring head 8 with a swivel carriage 9. A shank 10 (FIGS. 1 and 2) of the boring head 8 has its cone-shaped portion in the spindle 3. A cone-shaped collar 11 is provided on the cylindrical portion of the shank 10.

The spindle 3 also accommodates a hollow tie rod 12 (FIGS. 1 and 2).

Mounted on that end of the tie rod 12 which faces the boring head 8 are members intended for connection to the shank 10 of the boring head 8. These members are lobes 13 of a collet 14, which interact with the collar 11 of the shank 10. The opposite end of the tie rod 12 (FIG. 1) is connected to a drive 15 which moves the tie rod 12 in the axial direction for the lobes 13 of the collet 14 to be engaged with the collar 11.

In the embodiment under review, the drive 15 of the tie rod 12 is a hydraulic cylinder, also designated as 15, which is installed in the housing 1. A movable part 16 of the hydraulic cylinder 15 interacts with the tie rod 12.

An annular groove 17 is provided in the spindle 3 to receive the lobes 13 of the collet 14 when these are brought apart. The internal cavity of the tie rod 12 accommodates a bar 18. Mounted on that end of the bar 18 which faces the boring head 8 is an internal tooth rim 19. The latter meshes with an external tooth rim 20 provided on the end of a slide bar 21.

A wedge 22 (FIG. 1) is provided at the opposite end of the slide bar 21. The function of the wedge 22 is to convert axial motion of the bar 18 to radial motion of the carriage 9. The bar 18 is mounted on a slide 23 which is kinematically coupled through a screw gearing 24 and a coupling 25 to electromotors 26. For the tie rod 12 to rotate with the spindle 3, the former is coupled to the latter by means of a finger 27 received in a longitudinal groove 28 provided in the tie rod 12. The groove 28 is long enough for the tie rod 12 to engage with the shank 10 of the boring head 8.

A bushing 29 (FIG. 1) serves for radial location of the bar 18 and its rotation with the spindle 3 and tie rod 12. The bushing 29 is received in a groove 30 provided in the tie rod 12. Axial displacement of the bushing 29 is prevented on one side by the collet 14 rigidly mounted on the tie rod 12, and on the other side by the shoulder of the groove 30. The bushing 29 is kinematically coupled to the spindle 3 and bar 18. It is kinematically coupled to the spindle 3 by means of a finger 31 mounted on the spindle 3 and a profiled groove 32 (FIGS. 3 and 4) provided in the bushing 29.

The profiled groove 32 serves to rotate the bar 18 in relation to the spindle 3 through an angle sufficient for the teeth of the tooth rim 19 to be brought in a position opposite the teeth of the tooth rim 20.

The magnitude of this angle puts a limitation of the length of the axial stroke of the tie rod 12 with the bushing 29 necessary for the tooth rim 20 of the slide bar 21 to engage with the tooth rim 19 of the bar 18. The bushing 29 is kinematically coupled to the bar 18 by means of a finger 33 (FIGS. 2 and 3) mounted on the bushing 29 and extending through the bushing 29 and a hole 34 provided in the tie rod 12 into a longitudinal groove 35 provided in the bar 18.

The length of the longitudinal groove 35 must be equal to the stroke length of the bar 18 necessary to move the carriage 9 in the radial direction. The housing 1 (FIG. 1) is mounted on a bed 36. The housing 1 is movable in the axial direction, for which purpose it is kinematically coupled to a drive 37.

The spindle headstock according to the invention of a multiple-operation machine tool functions as follows.

The boring head 8 is installed in the spindle 3 with the main drive 7 switched off and with a proper angular orientation of the spindle 3 with regard to the housing 1.

Prior to installing the boring head 8 into the spindle 3, the slide 23 and the bar 18 are in their lowermost (according to the drawing) initial position. The tie rod 12 is also driven by the drive 15 to its lowermost position. The lobes 13 of the collet 14 are brought radially apart and received in the annular groove 17, making room for free passage of the collar 11 of the shank 10 of the boring head 8.

As the boring head is placed in the spindle 3, the collar 11 freely enters the cavity of the collet 14, and the teeth of the tooth rim 20 of the slide bar 21 enter the spaces between the teeth of the tooth rim 19 of the bar 18 as is shown in FIGS. 5 and 6.

Figure 8:
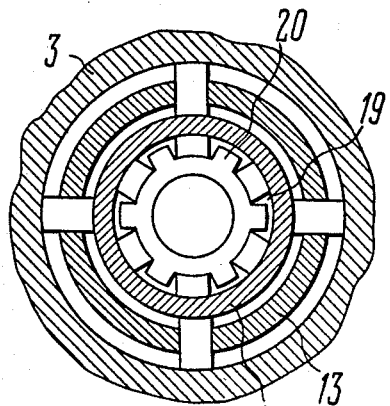
FIG. 8 is a section taken on line VIII—VIII in FIG. 2.
Figure 7:
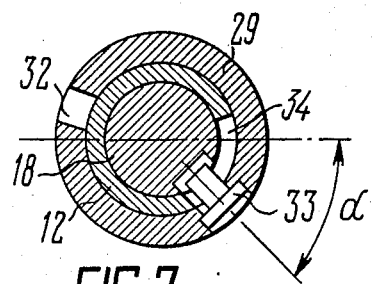
FIG. 7 is a section taken on line VII—VII in FIG. 5.

In order to secure the boring head 8 in the spindle 3, the drive 15 is switched off and the spring 38 (FIG. 1) drives the tie rod 12 along the axis of the spindle 3. The lobes 13 of the collet 14 are displaced in the radial direction and leave the annular groove 17. They abut against the collar 11 of the shank 10 and tightly secure the boring head 8 in the spindle 3. At the same time the finger 31 slides along the profiled groove 32 of the bushing 29, turning the latter about its axis through an angle α as shown in FIG. 7. As this takes place, the finger 33 turns the bar 18 about its axis, whereby the teeth of the tooth rim 19 are brought to a position opposite to the teeth of the tooth rim 20 of the slide bar 21 as is shown in FIG. 8, whereupon the electromotor 7 of the main rotary drive is switched on.

Depending on the machining program, i.e. depending on the cross-sectional shape of the hole to be made, the electromotor 26 is switched on and the slide 23 carrying the bar 18 is set in motion.

The machining being over, the spindle 3 is switched off, and the electromotor 26 drives the slide 23 back to its initial position. The drive 15 is switched on and the lobes 13 of the collet 14 are received in the annular groove 17, providing room for a free withdrawal of the collar 11 of the shank 10 of the boring head 8. As this takes place, the finger 31 slides along the profiled groove 32 and turns the bushing 29 and bar 18 back to their initial position. The teeth of the tooth rim 19 of the bar 18 are placed against the teeth of the tooth rim 20 of the slide bar 21.

The boring head 8 is removed from the spindle 3 and another tool is installed in its place.

What is claimed is:

1. A spindle headstock for a boring head of a multiple-operation machine tool, comprising: a housing; a hollow spindle rotatably installed in said housing; a drive to rotate said spindle; a shank of said boring head, accommodated in said spindle; a hollow tie rod installed in said spindle coaxially with the latter; said tie rod being rotatable together with said spindle and axially adjustable in relation to said spindle as it is connected to said shank of said boring head; a means for axial displacement of said tie rod; members for connection to said shank of said boring head, mounted on the end of said tie rod so that they can radially reciprocate for location; said shank of said boring head being adapted for connection to said members mounted on said tie rod; a bar installed in said tie rod coaxially with the latter, rotatable together with said spindle and said tie rod, and axially movable in relation to said tie rod; a means to drive said bar in the axial direction; toothed members mounted on the end of said bar to mesh with toothed members of a slide bar of said boring head, which slide bar serves to convert axial motion of said bar to radial motion of the carriage of said boring head; a bushing mounted on the tie rod; said bushing being stationary in the axial plane and kinematically coupled to said spindle and said bar to turn the bar so as to engage and disengage said toothed members.

2. A spindle headstock as claimed in claim 1, wherein the bushing is kinematically coupled to the spindle by means of a finger mounted on the spindle and a profiled groove provided in the bushing, and the same bushing is kinematically coupled to the bar by means of a finger mounted on the bushing and extending through a hole provided in the tie rod into a longitudinal groove provided in the bar.

* * * * *